United States Patent
Shimomura et al.

(10) Patent No.: US 6,526,471 B1
(45) Date of Patent: Feb. 25, 2003

(54) METHOD AND APPARATUS FOR A HIGH-SPEED MEMORY SUBSYSTEM

(75) Inventors: Tsutomu Shimomura, Incline Village, NV (US); Mark Peting, Tigard, OR (US)

(73) Assignee: Digeo, Inc., Kirkland, WA (US)

( * ) Notice: Subject to any disclaimer, the term of this patent is extended or adjusted under 35 U.S.C. 154(b) by 0 days.

(21) Appl. No.: 09/156,466

(22) Filed: Sep. 18, 1998

(51) Int. Cl.[7] .............................................. G06F 12/00
(52) U.S. Cl. ............................ 711/5; 711/111; 711/167
(58) Field of Search ............................. 711/5, 111, 167

(56) References Cited

U.S. PATENT DOCUMENTS

| | | | | |
|---|---|---|---|---|
| 5,636,173 A | * | 6/1997 | Schaefer ................. | 365/230.03 |
| 5,745,428 A | * | 4/1998 | Rao ........................ | 365/230.03 |
| 5,887,272 A | * | 3/1999 | Sartore et al. ............... | 711/105 |
| 5,889,714 A | * | 3/1999 | Schumann et al. .......... | 365/203 |
| 5,897,659 A | * | 4/1999 | Gittinger et al. ............ | 711/167 |
| 5,923,604 A | * | 7/1999 | Wright et al. ............ | 365/230.02 |
| 5,995,426 A | * | 11/1999 | Cowles et al. ............... | 365/201 |
| RE36,532 E | * | 1/2000 | Kim ........................... | 365/203 |
| 6,049,502 A | * | 4/2000 | Cowles et al. .......... | 365/189.04 |
| 6,064,619 A | * | 5/2000 | Ahn et al. ............... | 365/230.03 |
| 6,088,292 A | * | 7/2000 | Takahashi ............... | 365/189.08 |
| 6,094,397 A | * | 7/2000 | Hadderman et al. ... | 365/230.03 |
| 6,115,314 A | * | 9/2000 | Wright et al. ............... | 365/193 |
| 6,175,901 B1 | * | 1/2001 | Williams et al. ............ | 711/154 |

OTHER PUBLICATIONS

Product Brochure, "QED RISCMark™ RM5230™ 64–Bit Superscalar Microprocessor," Quantum Effect Design, Inc., 1996, Revision 1.2, Jul. 1998, pp. 1–19.

* cited by examiner

*Primary Examiner*—Matthew Kim
*Assistant Examiner*—C. P. Chace
(74) *Attorney, Agent, or Firm*—Blakely, Sokoloff, Taylor & Zafman LLP (57) ABSTRACT

A high speed memory system is disclosed. The high speed memory system remembers the active n memory rows for n banks of memory. When a memory access request for a memory address that falls within one of the active memory rows is received, the memory controller immediately responds to the memory access request. When a memory access request for a memory address that does not fall within one of the active memory rows is received, the memory controller immediately precharges and activates the desired memory address. For read operations, the memory controller responds with the data from the requested memory address after the memory has been precharged. For memory write operations, the memory controller forces the processor to halt the memory write request such that the memory controller will prepare itself by, precharging and activating the desired memory row. When the processor reissues the request, the memory controller will be prepared to immediately process the write request.

33 Claims, 7 Drawing Sheets

Figure 5

METHOD AND APPARATUS FOR A HIGH-SPEED MEMORY SUBSYSTEM

FIELD OF THE INVENTION

The present invention relates to the field of computer system design. In particular the present invention discloses a high-speed memory subsystem that quickly responds to processor memory requests.

BACKGROUND OF THE INVENTION

Early microprocessors (such as early 8-bit microprocessors) executed instructions fetched directly from a main memory. However, modern microprocessors now operate at speeds much faster than main memory can provide instructions. To accommodate the faster microprocessors, high-speed cache memory was added in between the main memory and the microprocessor. A cache memory may be internal (on the same die as the processor) or external (not on the same die as the processor). The high speed cache memory duplicates information stored in the main memory.

A cache controller is used to control processor accesses to the cache memory. If the cache controller that the cache memory does not contain a copy of a requested memory location, then the cache controller directs the memory request to the slower main memory. Accesses to a main memory are handled by a memory controller. Memory controllers perform a number of different functions. Memory controllers may handle memory interleaving, DRAM memory refreshing, and memory precharging.

To interface a relative slow main memory to faster microprocessor, a memory controller may latch information from the fast processor's memory request and then relay the memory request to the slow main memory. Specifically, to respond to a read request to main memory, the memory controller latches the requested memory address and then strobes a row and column address in the main memory. After the main memory returns a data value, the memory controller relays the data value back to the processor to respond to the processor's read request. During the steps of latching the read address, strobing the row and column addresses, and waiting for the main memory response, the processor remains idle. The multi-step process of accessing main memory through a standard memory controller significantly slows non-cache memory accesses. It would therefore be desirable to design a memory control system that accesses main memory in a more efficient manner.

SUMMARY OF THE INVENTION

A high speed memory control system is disclosed. The memory system of the present invention stores the active n memory rows for m banks of memory. When a memory access request for a memory address that falls within one of the active memory rows is received, the memory controller immediately responds to the memory access request. When a memory access request for a memory address that does not fall within one of the active memory rows is received, the memory controller immediately precharges the desired memory address. For read operations, the memory controller responds with the data from the requested memory address after the memory has been precharged. For memory write operations, the memory controller forces the processor to halt its memory write request.

Other objects feature and advantages of present invention will be apparent from the company drawings and from the following detailed description that follows below.

BRIEF DESCRIPTION OF THE DRAWINGS

The objects, features and advantages of the present invention will be apparent to one skilled in the art, in view of the following detailed description in which.

DETAILED DESCRIPTION OF THE PREFERRED EMBODIMENT

A method and apparatus for implementing a high speed memory controller is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the Quantum Effect Design Rm52xx line of processors. However, the same techniques can easily be applied to other types of processors.

A Typical Prior Art Memory System

Figure 1A:
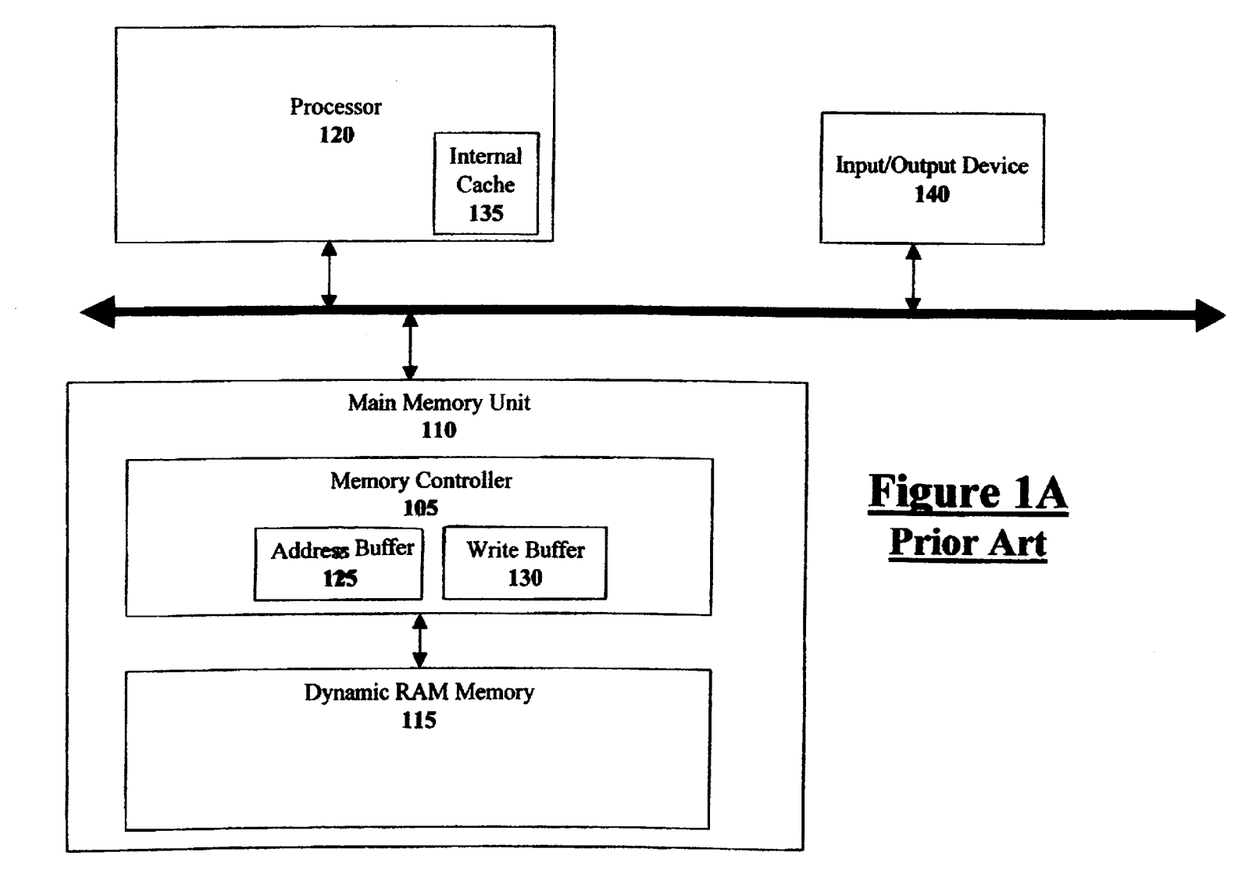
FIG. 1A illustrates a prior art memory system with a memory controller that controls a main memory.

FIG. 1A illustrates a prior art computer system. In the computer system of FIG. 1A, the core of a processor 120 fetches instructions from a first level local instruction cache 135 or a main memory unit 110. If the desired instruction is in the first level local instruction cache 135, then the processor core fetches from that first level instruction cache 135. Otherwise, the processor core must fetch the desired instruction from a slower off-chip memory source. In the embodiment of FIG. 1A, the processor must fetch from a main memory unit 110. (In some embodiments, a second level cache may be present as a faster alternative to the slow main memory.)

Figure 1B:
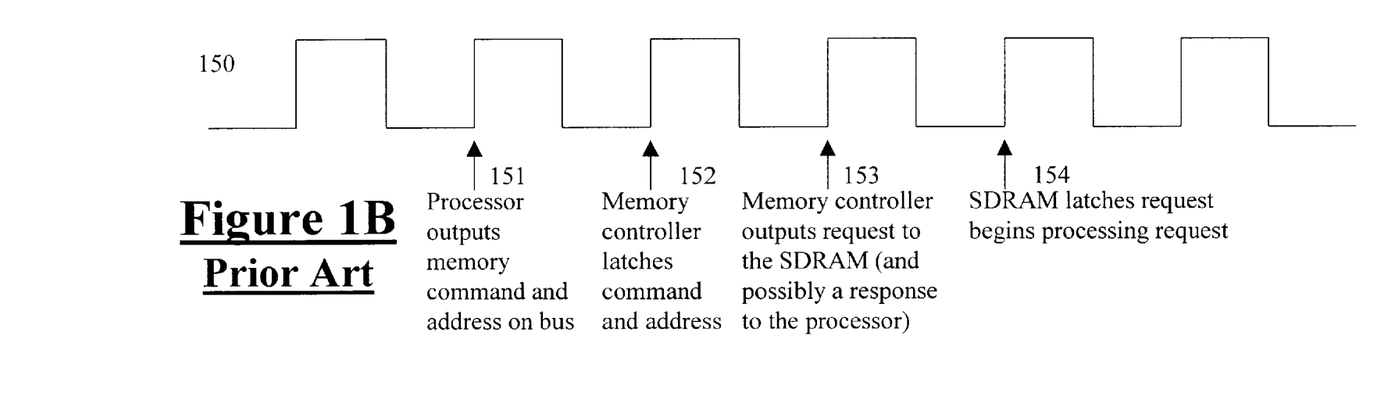
FIG. 1B illustrates a first possible timing diagram of a memory access using the prior art memory system such as the memory system of FIG. 1A

When the processor fetches instructions or data from the main memory unit 110, a memory controller 105 handles the memory request. A memory request will be described with reference to FIG. 1A and FIG. 1B. The processor issues the memory request comprising a memory command (control lines) and an address at cycle 151 in FIG. 1B. The memory controller 105 typically latches the memory command and the memory address into an address buffer 125 as stated in cycle 152. The memory controller 105 then generates a properly formatted memory request that is placed on a dedicated memory bus 130 to access a location in the dynamic random access memory (DRAM) 115 during memory cycle 153 of FIG. 1B. In one embodiment, the memory controller first strobes a row address and then strobes a column address. Finally, the DRAM begins processing the memory request at cycle 154. When the DRAM memory returns a data value, that data value is returned to the processor.

Figure 1C:
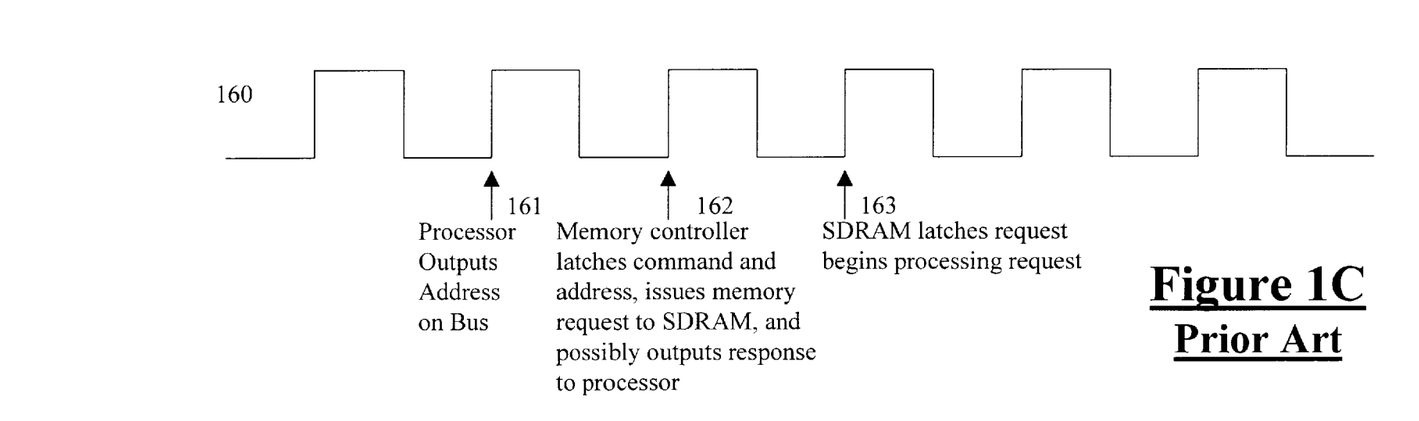
FIG. 1C illustrates a second possible timing diagram of a memory access using the prior art memory system such as the memory system of FIG. 1A

In a faster implementation, the steps of latching the memory command/address in the memory controller and outputting a request to the DRAM memory are combined into a single step 162 illustrated in FIG. 1C. In such an implementation, the DRAM memory 115 can latch the request at the third memory cycle 163.

Write instructions are handled by using a write buffer 130 in the memory controller. Specifically, where the processor writes to a memory address in the main memory 110 as depicted in memory cycle 161, the memory control 105 then latches the write address into an address buffer 125 and then captures the write data into a write buffer 130 in the main memory controller 105 as stated in step 152. Next, the memory controller 105 issues a write request into the dynamic random access memory (DRAM) 115 using the write address stored in the address buffer 125 at step 153. The DRAM 115 latches the memory request at step 154. Finally, the memory controller then writes the data into the dynamic random access memory (DRAM) 115. Again, it should be noted that there are faster implementations as illustrated in FIG. 1C.

As illustrated in the prior art memory system of FIG. 1A, the dynamic random access memory (DRAM) 115 is completely separated from the processor bus 190. Thus, all interaction between the processor 120 and the dynamic random access memory (DRAM) 115 is completely controlled by the memory controller 105.

A High Speed Reflex Memory System

Figure 2A:
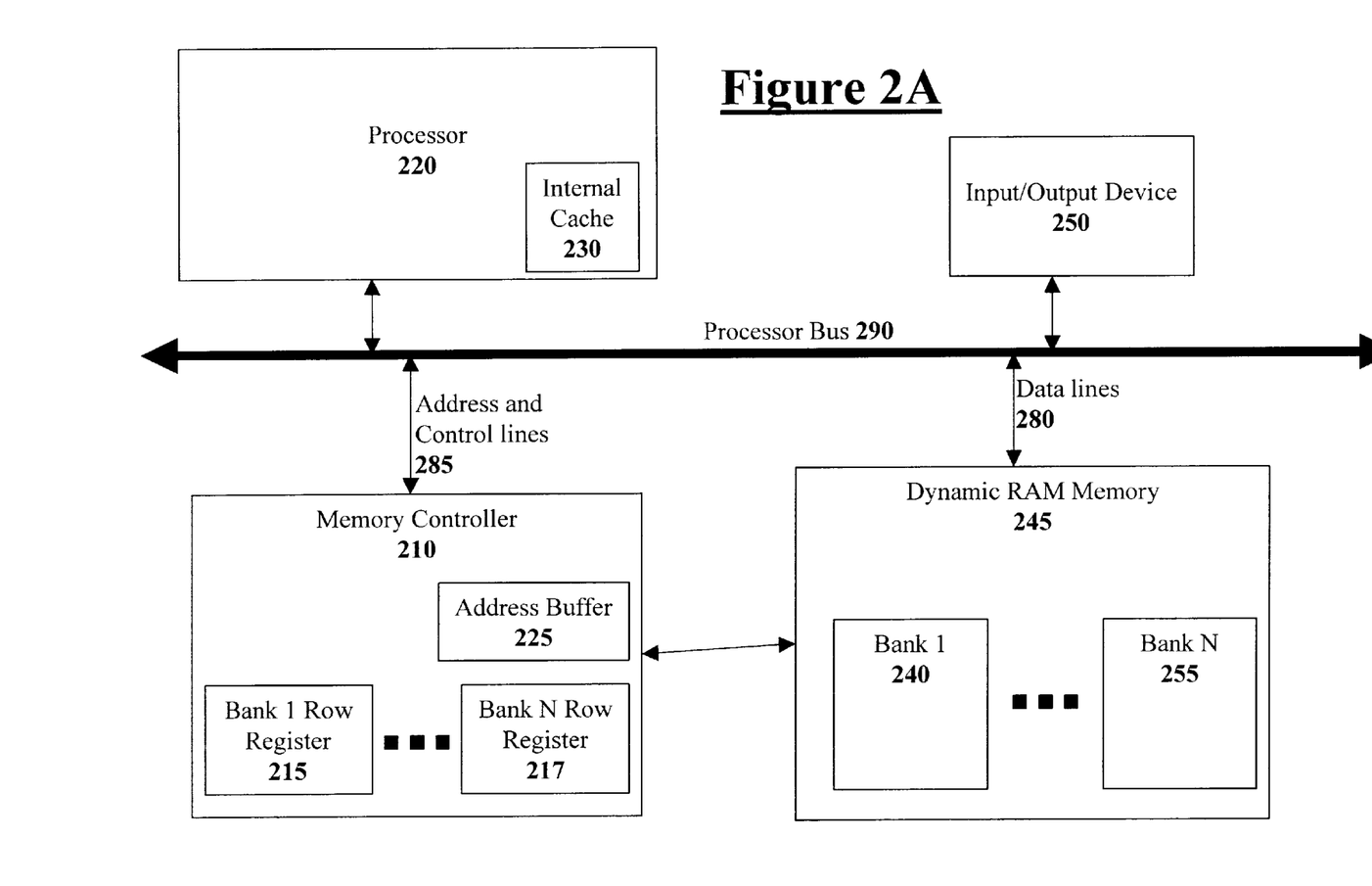
FIG. 2A illustrates a memory system constructed according to the teachings of the present invention.

To improve upon the prior art, the present invention introduces a high speed reflex memory subsystem. The reflex memory system comprises a high speed memory controller and memory that is connected directly to the processor bus. In a preferred embodiment, the high speed memory controller is implemented with high speed combinatorial logic and the memory comprises synchronous dynamic random access memory (SDRAM). FIG. 2A illustrates one embodiment of the reflex memory system of the present invention.

Referring to FIG. 2A, the present invention directly couples memory 245 to the processor bus 290. In the embodiment of FIG. 2A, the memory 245 is Synchronous Dynamic Random Access Memory (SDRAM), however, other types of memory can be used. The memory used by the present invention is organized into one or more memory banks wherein each memory bank is independent of the other memory banks. In the embodiment of FIG. 2, only two memory banks (240 and 255) are illustrated. However, the teachings of the present invention can apply to any number of memory banks.

In one embodiment, each memory bank may be in an "active" or an 'inactive' state. Futhermore, each memory bank is divided into rows and columns as is well known in the art of computer memories. When a memory bank is active, the most recently accessed row is known as the "active" row (or active page) in a particular memory bank. The active row is different than other rows in a memory bank since the active row is immediately available such that any reads or writes to the active row can be handled immediately. Such memory "hits" to the active row are handled very quickly such that row hit response times are just as fast as cache memory responses. If the memory bank to be, accessed is inactive then the memory must be activated with an activate command before.using the memory bank. In one embodiment, the bank activate command includes a row parameter that specifies the row (or page) that should be made active. If a memory access request needs to access a row in the active bank other than the currently active row, then the current row must be "closed" and the bank moved into an inactive state before accessing the desired row. The steps of deactivating the bank is known as precharging the bank and is performed with a "precharge" command. After precharging a bank, the bank must be activated with the row that will be accessed.

Figure 2B:
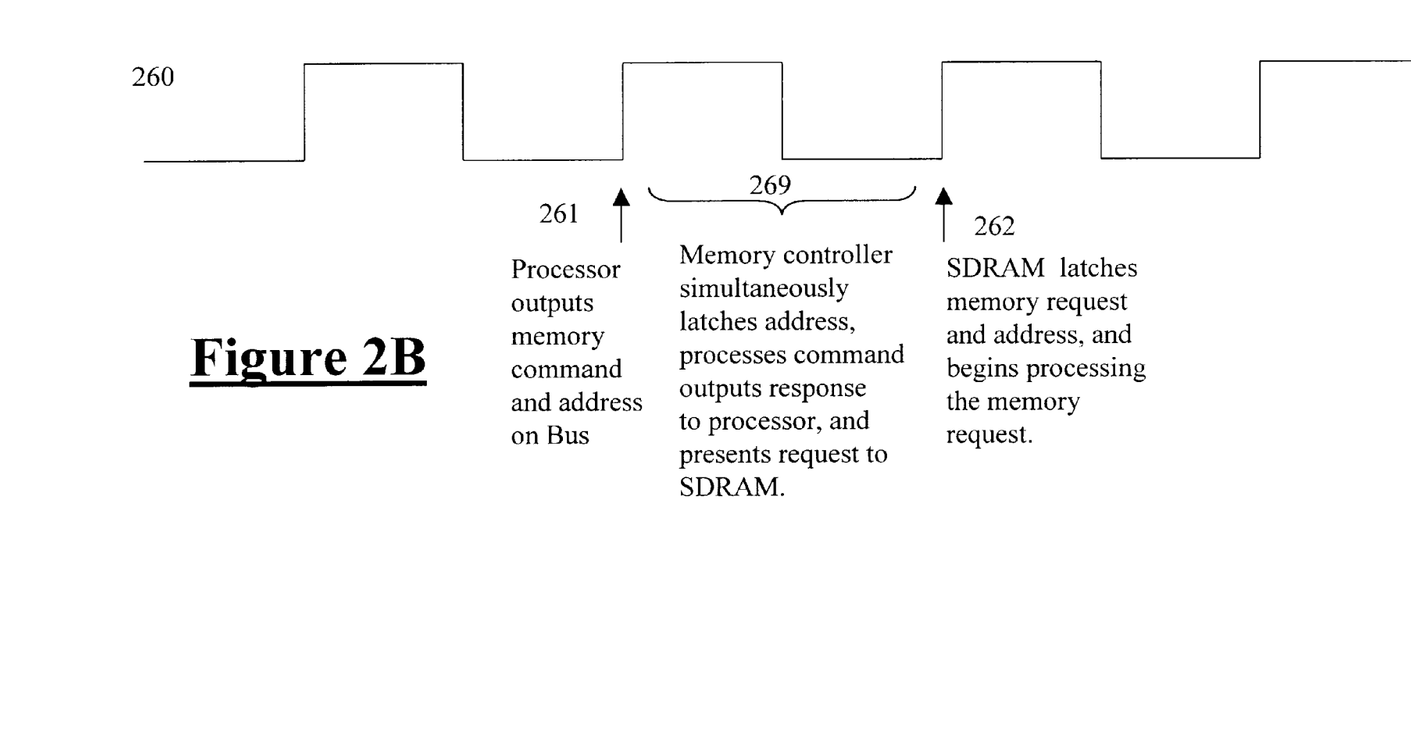
FIG. 2B illustrates one possible timing diagram of a memory access using the memory control system of the present invention such as the memory system of FIG. 2A

Referring to FIG. 2A and FIG. 2B, the memory controller 210 of the present invention is coupled to a processor bus 290 such that the memory controller receives memory address information and control information about each memory access at cycle 261. The memory controller 210 includes at least two types of data registers: an address buffer and at least one active memory bank row register. The address buffer 225 latches the memory address of a location in the memory that the processor is attempting to read or write. The memory bank row registers (215 and 217) store the location of the active row in each of the memory banks in the memory 245. (Note that only two memory bank row registers are illustrated in FIG. 2A.

In high speed memory subsystem of the present invention, the memory controller 210 is responsible for determining if a memory request issued by the processor 220 can be immediately handled. To make this determination, the memory controller 210 examines the memory bank row registers to see if the desired memory location is within an active row. If the desired location is within an active row, then the memory 245 is instructed to immediately respond to the memory request. If the desired memory location is not within an active row, then the memory controller 210 immediately begins the necessary actions to fulfill the memory request. The memory controller 210 is implemented in very high speed combinatorial logic wherein the memory controller 210 responds within a single clock cycle such that the proper memory command to fulfill the memory request is issued to the SDRAM within that single clock cycle as illustrated in cycle 269. The SDRAM can then act upon the memory request at the next rising clock edge as depicted in cycle 262. The SDRAM will immediately respond to active row hits, begin precharging for active row misses, or activate for inactive banks. To best illustrate the operation of the high speed memory subsystem of the present invention both a read operation and write operation will be described.

A Memory Read Operation

Figure 3:
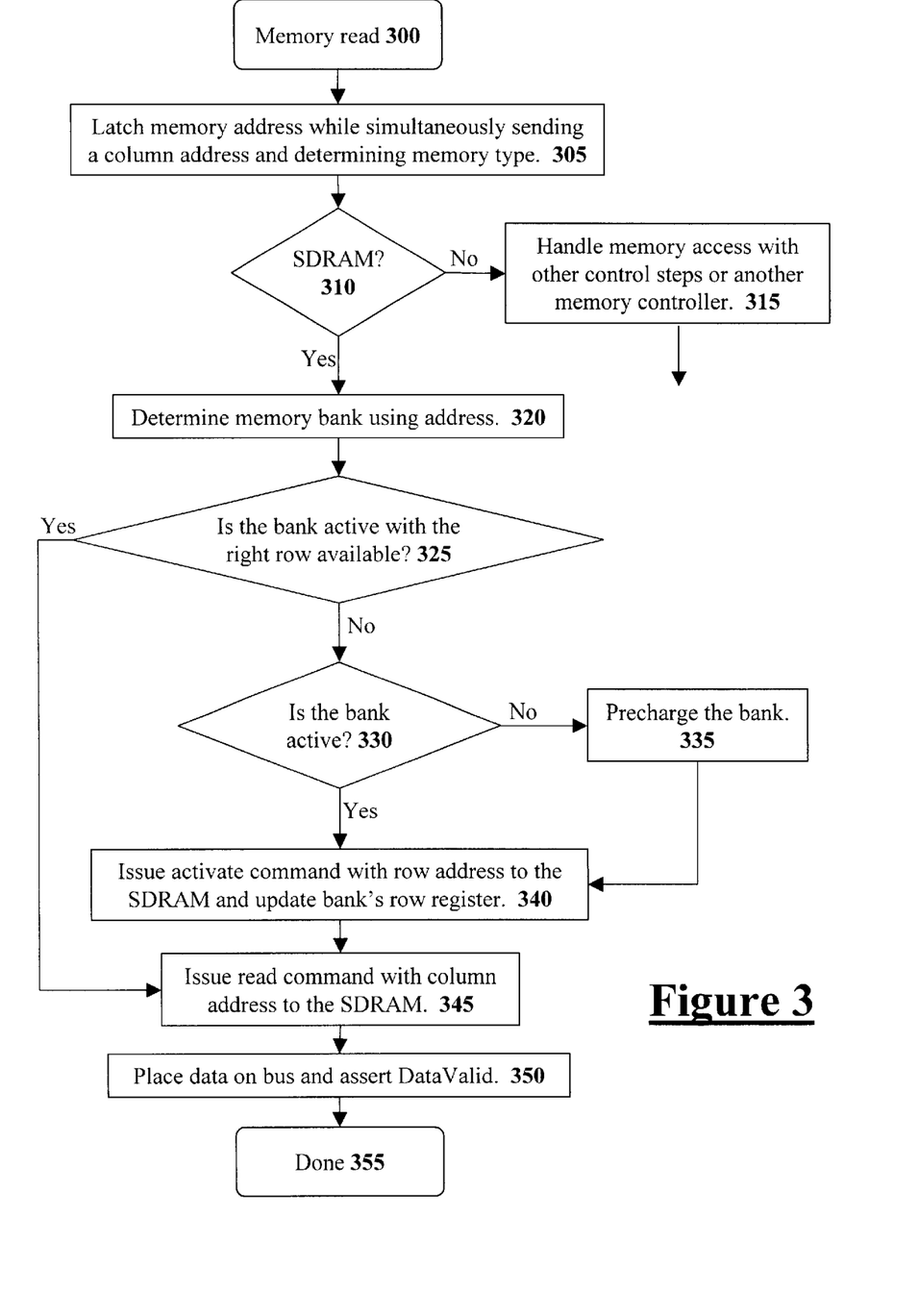
FIG. 3 illustrates a flow diagram describing the steps performed during a memory read operation.

FIG. 3 illustrates a flow diagram that describes how memory system constructed according to the teachings of the present invention handles read requests from the processor. The example of FIG. 3 will be descried with reference to the high speed memory subsystem of FIG. 2. At step 300, a memory read operation is issued to processor 220. In memory mapped I/O systems, the memory read may actually be an access to an input/output device such as a video display, serial port, or other input/output device.

At step 305, the memory controller 210 of the present invention latches the requested memory by storing the memory address into an address buffer 225 while simultaneously passing the column address to the main memory and determining what type of memory is being accessed. (It should be noted that some steps illustrated in FIG. 3 may be listed as individual distinct steps for simplicity, however many steps may be performed concurrently by the combinatorial-logic of the memory controller.) In one embodiment, determining the type of memory that is being addressed is performed using a memory map that defines the types of memory assigned to different address locations.

At step 310, the memory controller decides 210 how to handle the memory request depending on the type of memory that is being accesses. To avoid obscuring the important aspects of the present invention, this example will only describe how Synchronous Dynamic Random Access Memory (SDRAM) is handled. Thus, if the memory type that is being accessed is not SDRAM, then another set of memory control operations are performed at step 315 or another memory controller may control the memory request.

When the requested memory address falls within the SDRAM memory, the memory controller 210 must determine which memory bank (240 or 255) is being accessed at step 320. In one embodiment, this is performed by examining one or more address bits in the requested memory address. After determining the memory bank (240 or 255) that is being accessed, the memory controller 210 determines if the memory address being requested falls within the active row for that memory bank at step 325. Specifically, the memory controller 210 determines if the memory address being requested falls within the active row for that memory bank by comparing the row address bits of the requested memory address with the memory bank row register (215 or 217) for the memory bank being accessed.

Referring again to step 325 of FIG. 3, if a requested memory address falls within the active row of the appropriate memory bank (an active row "hit") then the memory controller 210 proceeds to step 345 where a read command is issued to the SDRAM 245. The read command specifies the desired column address. Note that since the column address was passed directly through to the SDRAM at step 305, the column address is already available and just the command must be submitted. Thus, active row hits are processed very quickly. Note that due to program locality and data locality, most SDRAM 245 memory read requests will fall within the same active row that was accessed in preceding memory read requests such that the number of active row "misses" is kept to a minimum.

Referring back to FIG. 325, if the requested memory address does not fall within the active row of the appropriate memory bank (an active row "miss") then the memory controller proceeds to step 330 where the memory controller determines if the desired memory bank is active. If the desired memory bank is active (with the wrong row row available), then the memory controller precharges the desired memory bank as stated in step 335. After precharging the memory bank, the desired row of the memory bank is activated at step 340. The new active row is noted in the bank's active row register within the memory controller at step 340.

Referring back to step 330, if the memory bank is not active, then the memory controller immediately proceeds to step 340 where the memory controller activates the desired row of the memory bank and updates the bank's active row register within the memory controller. In the embodiment depicted in FIG. 3 where the active row is not closed after each memory access, the skipping of the precharge step 335 normally does not occur. The only situation when the precharge step 335 is skipped is when there has been a SDRAM memory refresh that closed (precharged) the memory bank.

In an alternate embodiment where the memory banks are closed (precharged) after every memory access, the step of precharging is not required since the precharging is done after each memory access. In such an embodiment step 330 is not necessary and the precharging step 335 occurs after each memory access. However, in such an embodiment, the very fast memory access that occurs during an active row hit as specified with steps 325 and 345 would never occur since the bank is not active at the beginning of each memory access. Yet, such an embodiment (that precharges after each memory access) would still benefit from the teachings of the present invention since the activating of the desired memory bank would still occur at the very next clock cycle as depicted in FIG. 2B.

After activating the desired memory row in the desired memory bank at step 340, the memory controller then issues the actual read command as step 345. The read command is accompanied by the column portion of the memory address to be accessed. The memory command is latched by the SDRAM 245 at the beginning of cycle 262 illustrated in FIG. 2B. When the SDRAM 245 responds to the memory read request, the SDRAM 245 places the desired memory value directly onto the processor bus 290. At the same time that the SDRAM 245 places the desired memory value directly onto the processor bus 290, the memory controller 210 asserts a "data valid" control signal on the processor bus 290. After the memory controller has asserted the data valid" signal, the processor may sample the data on the processor bus 290.

A Memory Write Operation

Figure 4:
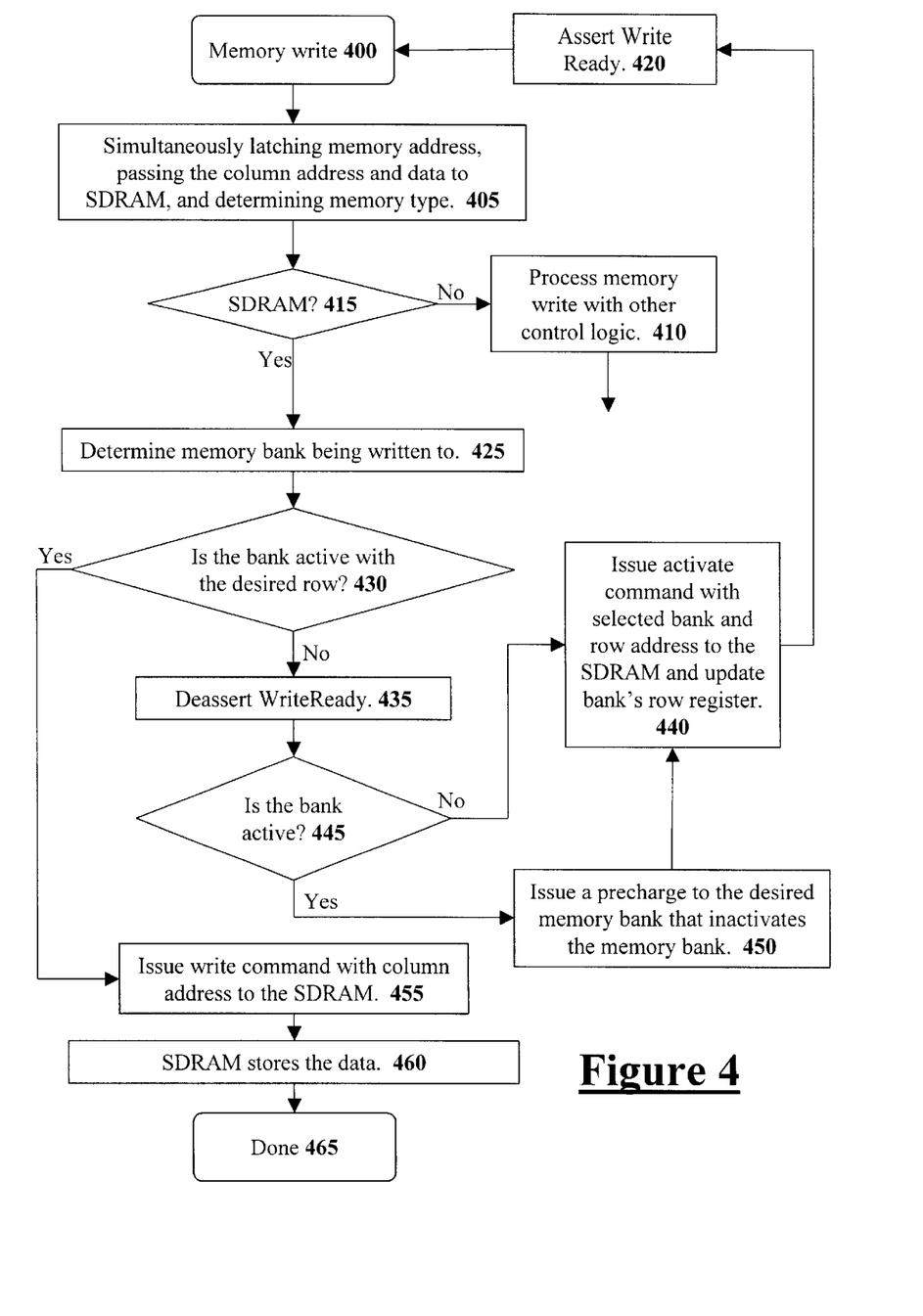
FIG. 4 illustrates a flow diagram describing the steps performed during a memory write operation.

FIG. 4 illustrates a flow diagram that describes how a memory system constructed according to the teachings of the present invention may handle memory write requests from the processor. The memory write operation of the present invention will be described with reference to a processor architecture that monitors a write ready signal from a memory subsystem where the write ready signal informs the processor that memory is ready to accept a memory write. Examples of processors that monitor a write ready signal include the RM52xx series processor from Quantum Effect Design of Santa Clara, Calif. However, the teachings of the present invention can be used with any processor that can have its memory write operation halted or stalled. The memory write example of FIG. 4 will be described with reference to the high speed memory subsystem of FIG. 2A. Referring to step 400, a memory write operation is issued from processor 220.

At step 405, the memory controller 210 of the present invention simultaneously latches the memory write address by storing the memory address into address buffer 225, passes the column address and data to the SDRAM 245, and determines the memory type being accessed. In alternate embodiments wherein the processor does not retry memory writes, the data can be stored in a write buffer. The memory controller 210 determines what type of memory is being accessed by examining a memory map. At step 415, the memory controller decides 210 how to handle the memory write depending on the type of memory that is being accessed. If the memory type that is being accessed is not SDRAM, then an other set of memory control operations are performed or another memory controller handles the memory request at step 410.

When the memory write is directed toward an address that falls within the SDRAM memory, the memory controller 210 must determine which memory bank (240 or 255) is being accessed at step 425. In one embodiment, this is performed by examining one or more address bits in the memory write address. After determining the memory bank (240 or 255) that is being accessed, the memory controller 210 determines if the memory write address falls within the active row for that memory bank at step 430. The memory controller 210 determines if the memory write address falls within the active row for that memory bank by comparing the row address bits of the write address with the memory bank's row register (215 or 217) for the memory bank being accessed.

If the memory controller a memory write address falls within the active row of the appropriate memory bank (an active row "hit") then the memory controller 210 proceeds to step 455 where a memory write command is issued to the SDRAM 245. Note that since the column address and data have already been passed to the SDRAM 245 at step 405, the memory controller merely needs to issue the write command. After the memory write command is sent, the SDRAM 245 immediately accepts the data value sent by the processor 220 into the SDRAM 245 as stated in step 460.

Referring back to step 430, if the requested memory address does not fall within the active row of the appropriate memory bank (an active row "miss") then the memory controller proceeds to step 435 where the memory controller 210 quickly deasserts a write ready signal directed to the processor. In an embodiment with an RM52xx series microprocessor, the memory controller 210 must deassert the write ready signal during the address cycle of the processor's memory write operation. Other processors may have their writes halted or stalled using similar commands. In the embodiment of FIG. 4, the processor responds to the deasserted write ready signal by backing off the processor bus. The processor 220 will attempt the memory write at a later time. In a preferred embodiment, the amount of time that the processor backs off the processor bus is just long enough for the dynamic random access memory to precharge the memory bank and activate the memory bank with the correct row such that the SDRAM will be ready to accept the write request when the processor reissues the memory write request.

After deasserting the write ready signal at step 435 (or performing other signalling to halt or stall the processor write), the memory controller 210 then determines if the desired memory bank is active at step 445. If the bank is active (with the wrong row), the memory controller 210 proceeds to step 450 where the memory controller 210 issues a precharge command to the desired memory bank such that the memory bank is deactivated. Thus, as soon as the memory controller 210 identifies the memory bank as being activated with the wrong row active, a precharge request is sent to the SDRAM 245. Next, the memory controller 210 proceeds to step 440 where the memory controller 210 issues an activate command that activates the desired row. The memory controller also updates the memory bank's row register (215 or 217) with the new active row at step 440. Finally, at step 420, the write ready is reasserted such that the processor 220 may reissue the memory write request to a memory controller that is now prepared to immediately fulfill the memory write operation.

Referring back to step 445, if the memory bank was not active, the memory controller 210 proceeds directly to step 440 where the memory controller 210 immediately issues the activate command to the SDRAM 245 and updates the memory bank's active row register (215 or 217). After step 440, the memory controller then proceeds to step 420 where the write ready signal is reasserted such that the processor 220 may reissue the memory write request to a memory controller that is now prepared to immediately fulfill the memory write operation. As previously set forth, the memory controller in the embodiment described in FIG. 4 will rarely encounter an inactive bank since the bank will only be inactivated if a memory refresh cycle occurred just prior to the memory write operation.

Design Considerations

To build a high speed memory system according to the teachings of the present invention, a system designer must carefully design the memory system to respond very quickly. In one embodiment, the memory controller combinatorial logic is implemented in high speed Gallium-Arsenide or BiCMOS logic to meet the single cycle response time. In one embodiment, the memory controller logic is implemented in two cascaded Generic Array Logic (GAL) devices with three nanosecond response times. The cascaded GAL devices performed the needed memory controller functions with one processor cycle. In a preferred embodiment, the memory controller is implemented within an.Application Specific Integrated Circuit (ASIC) such that the tight timing requirements will be easily met even with higher processor speeds.

Figure 5:
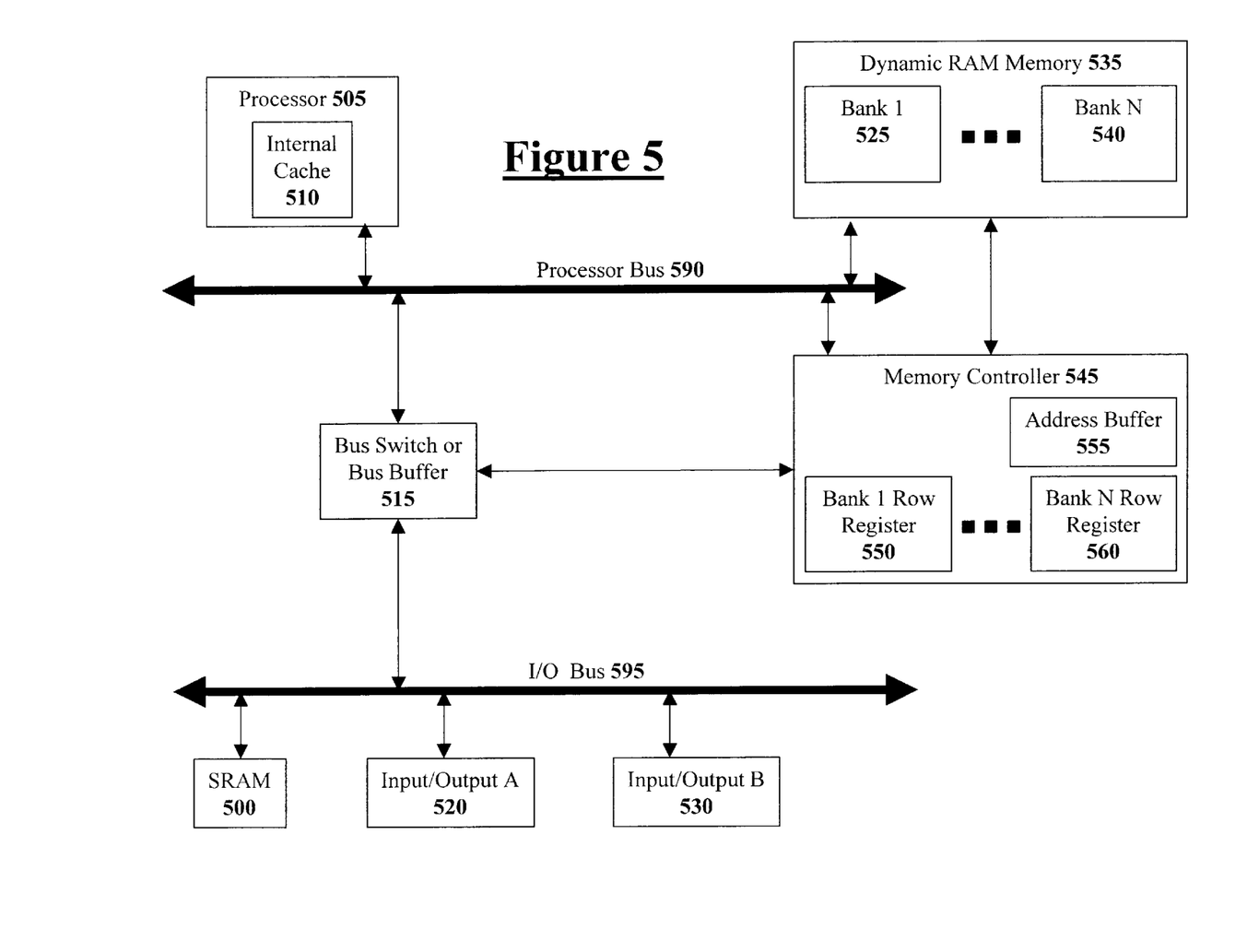
FIG. 5 illustrates an embodiment of the present invention wherein processor bus trace lines are kept short using a bus switch or bus buffer.

In addition to using high speed logic to meet the aggressive timing requirements, the electrical interconnects between the processor, the memory controller, and the SDRAM must be as short as possible to reduce the parasitic capacitance. FIG. 5 illustrates one method of reducing the load on the processor bus. Specifically, in FIG. 5 the memory controller 545 controls a bus switch or bus buffer 515 that isolates all elements from the processor bus 590 except the processor 505, the memory controller 545, and the main memory 535.

Referring to the embodiment of FIG. 5, when the processor 505 issues a memory read or memory write request, the memory controller 545 determines if the memory request is directed toward the main memory 535. If the memory controller 545 determines that the processor is not accessing the main memory 535, then the memory controller 545 opens the bus switch 515 (or activates the bus buffer 515) such that the memory request will propagate to the other elements that the processor 505 may address such as SRAM 500, input/output device A 520, or input/output device B 530. Thus, the bus switch or bus buffer 515 keeps the electrical load on the processor bus 590 very low when the memory requests are addressed to the memory controller 545 and the main memory 535.

The foregoing has described a high speed memory control subsystem. It is contemplated that changes and modifications may be made by one of ordinary skill in the art, to the materials and arrangements of elements of the present invention without departing from the scope of the invention.

We claim:

1. A method of responding to a memory write request with a memory controller that controls synchronous dynamic random access memory (SDRAM), said method comprising the steps of:

latching a memory write address for said memory write request from a processor into an address buffer of said memory controller while simultaneously determining if a memory row of said SDRAM encompassing said memory write address is active using logic in said memory controller, said SDRAM is directly connected to a processor bus;

accepting data into a memory location of said SDRAM associated with said memory write address without delay when a memory row containing said memory location associated with said memory write address is active; and signaling from said memory controller to said processor that said memory controller is not ready to accept data when said memory row containing said memory location of said SDRAM associated with said, memory write address is not active.

2. The method as claimed in claim 1, said method further comprising:
   determining a selected memory bank based upon said memory write address; and
   comparing a set of row bits from said memory write address with a row register associated with said selected memory bank, said row register storing an active memory row address for said memory bank.

3. The method as claimed in claim 1, said method further comprising:
   precharging a memory row identified by said memory write address after signaling from said memory controller to said processor that said memory controller is not ready to accept data when said memory row defined containing said memory location of said SDRAM associated with said memory write address is not active.

4. The method as claimed in claim 1 wherein signaling from said external memory controller to said processor that said memory controller is not ready to accept data comprises deasserting a write ready signal.

5. A memory controller for responding to a memory access request to a synchronous dynamic random access memory (SDRAM) from a processor, said memory controller comprising:
   an address buffer, said address buffer for latching a memory address of said memory access request;
   at least one memory row register, said memory row register for storing a memory row address of an active row in an associated memory bank of said SDRAM, said SDRAM directly connected to a processor bus; and
   memory control logic, said memory control logic determining if said memory address of said memory access request is within an active row of said SDRAM and responding to a memory access within a single clock cycle if said memory address of said memory access request is within said active row of said SDRAM, else said memory control logic signaling to said processor that said memory controller is not ready if said memory address of said memory access request is within an inactive row.

6. The memory controller as claimed in claim 5 wherein there are multiple memory banks in said SDRAM and an associated memory row register within said memory controller for each memory bank in said SDRAM.

7. A computer system, said computer system comprising:
   a processor, said processor having a processor bus, said processor bus comprising address lines, data lines, and control lines;
   a synchronous dynamic random access memory (SDRAM), said SDRAM directly coupled to address and data lines of said processor bus;
   a memory controller coupled to said address lines and control lines, said memory controller comprising:
      at least one memory row register, said memory row register for storing a memory row address of an active row in an associated memory bank of said SDRAM; and
      memory control logic, said memory control logic determining if said memory address of a memory access request is within an active row of said SDRAM and initiating a memory access to said SDRAM within a single clock cycle if said memory access request is within an active row of said SDRAM.

8. The computer system as claimed in claim 7 wherein said address lines and data lines are multiplexed on a single set of electrical lines.

9. The method as claimed in claim 1 wherein signaling from said memory controller to said processor that said memory controller is not ready to accept data comprises deasserting a write ready signal.

10. The memory controller as claimed in claim 5 wherein signaling to said processor that said memory controller is not ready comprises deasserting a write ready signal.

11. The memory controller as claimed in claim 5 wherein signaling to said processor that said memory controller is not ready comprises keeping a Data Valid signal inactive.

12. The computer system as claimed in claim 7 wherein signaling to said processor that said memory controller is not ready comprises deasserting a write ready signal.

13. The computer system as claimed in claim 7 wherein signaling to said processor that said memory controller is not ready comprises keeping a Data Valid signal inactive.

14. A method for responding to a memory access request from a processor comprising:
   latching a requested memory address into an address buffer of a memory controller;
   determining whether said requested memory address falls within an active row of said memory by said memory controller external to said memory, said memory directly coupled to a processor bus;
   issuing a command associated with said memory access request when said requested memory address falls within the active row of said memory.

15. The method of claim 14 wherein said command is a read command.

16. The method of claim 14 wherein said command is a write command.

17. The method of claim 14 further comprising determining whether a memory bank comprising said row is active when said memory request falls within an inactive row of said memory.

18. The method of claim 17 further comprising precharging said memory bank when said memory bank is active.

19. The method of claim 17 further comprising activating said row.

20. The method of claim 16 further comprising deasserting a write ready signal directed to said processor.

21. The method of claim 14 wherein said memory is SDRAM.

22. The method of claim 17 further comprising said memory control logic signaling to said processor that said memory controller is not ready if said memory access request is within an inactive row of said SDRAM.

23. A method for responding to a memory access request from a processor comprising:
   means for latching a memory write address for said memory write request from a processor into an address buffer of said memory controller while simultaneously determining if a memory row of said SDRAM encompassing said memory write address is active using logic in said memory controller, said SDRAM directly coupled to a processor bus;
   means for accepting data into a memory location of said SDRAM associated with said memory write address without delay when a memory row containing said memory location associated with said memory write address is active; and means for signaling from said memory controller to said processor that said memory controller is not ready to accept data when said memory row containing said memory location of said SDRAM associated with said memory write address is not active.

24. The method of claim 23 said method further comprising:

means for precharging a memory row identified by said memory write address after signaling from said memory controller to said processor that said memory controller is not ready to accept data when said memory: row defined containing said memory location of said SDRAM associated with said memory write address is not active.

25. The method of claim 23 wherein the means for signaling from said external memory controller to said processor that said memory controller is not ready to accept data comprise means for deasserting a write ready signal.

26. A method for responding to a memory access request from a processor comprising:

means for latching a requested memory address into an address buffer of a memory controller;

means for determining whether said requested memory address falls within an active row of said memory by said memory controller external to said memory, said memory directly coupled to a processor bus;

means for issuing a command associated with said memory access request when said requested memory address falls within the active row of said memory.

27. The method of claim 26 wherein said command is a read command.

28. The method of claim 26 wherein said command is a write command.

29. The method of claim 26 further comprising means for determining whether a memory bank comprising said row is active when said memory request falls within an inactive row of said memory.

30. The method of claim 29 further comprising means for precharging said memory bank when said memory bank is active.

31. The method of claim 29 further comprising means for activating said row.

32. The method of claim 28 further comprising means for deasserting a write ready signal directed to said processor.

33. The method of claim 26 wherein said memory is SDRAM.

* * * * *